Nov. 22, 1932.  G. A. RICHTER ET AL  1,888,771
MANUFACTURE OF FELTED FIBROUS SHEET MATERIAL OF HIGH ABSORPTIVITY
Original Filed June 14, 1927   3 Sheets-Sheet 1
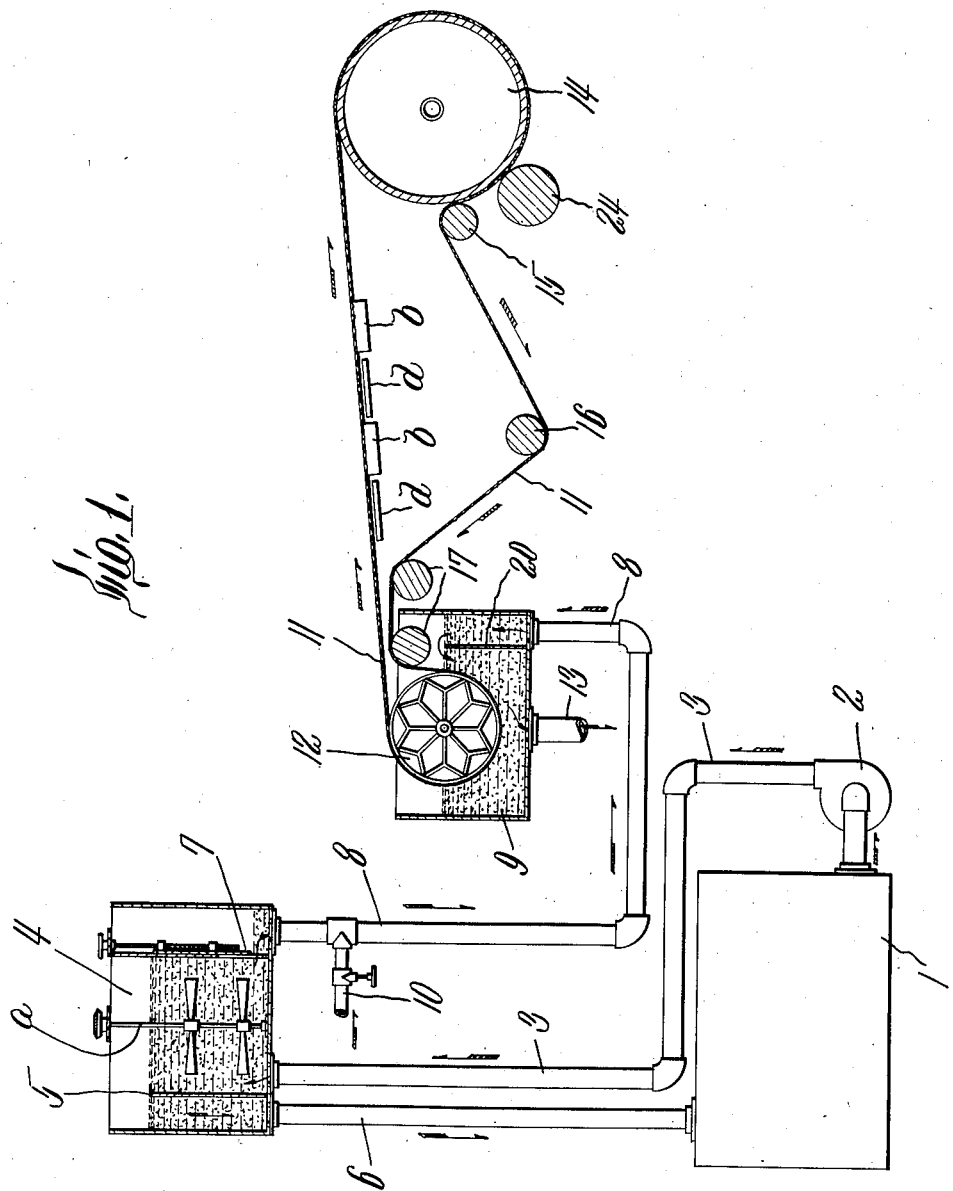
Inventors
George A. Richter
Henry A. Chase
by Wright, Brown, Quinby & May
Attys

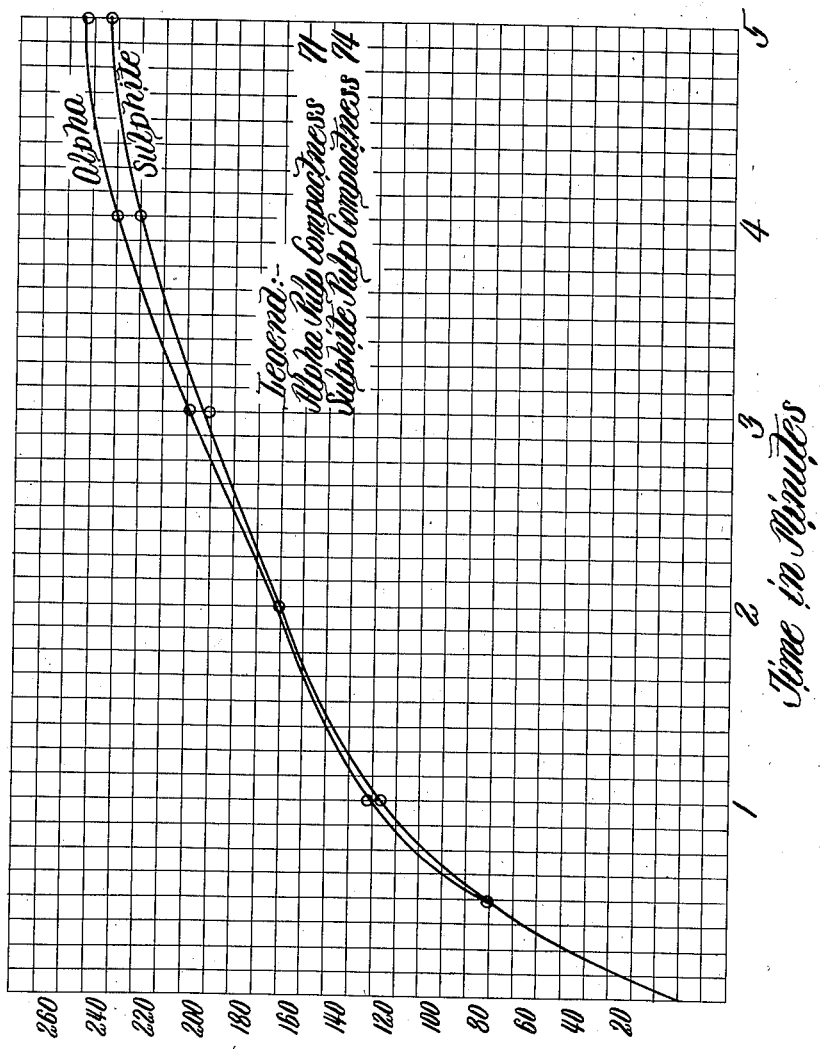

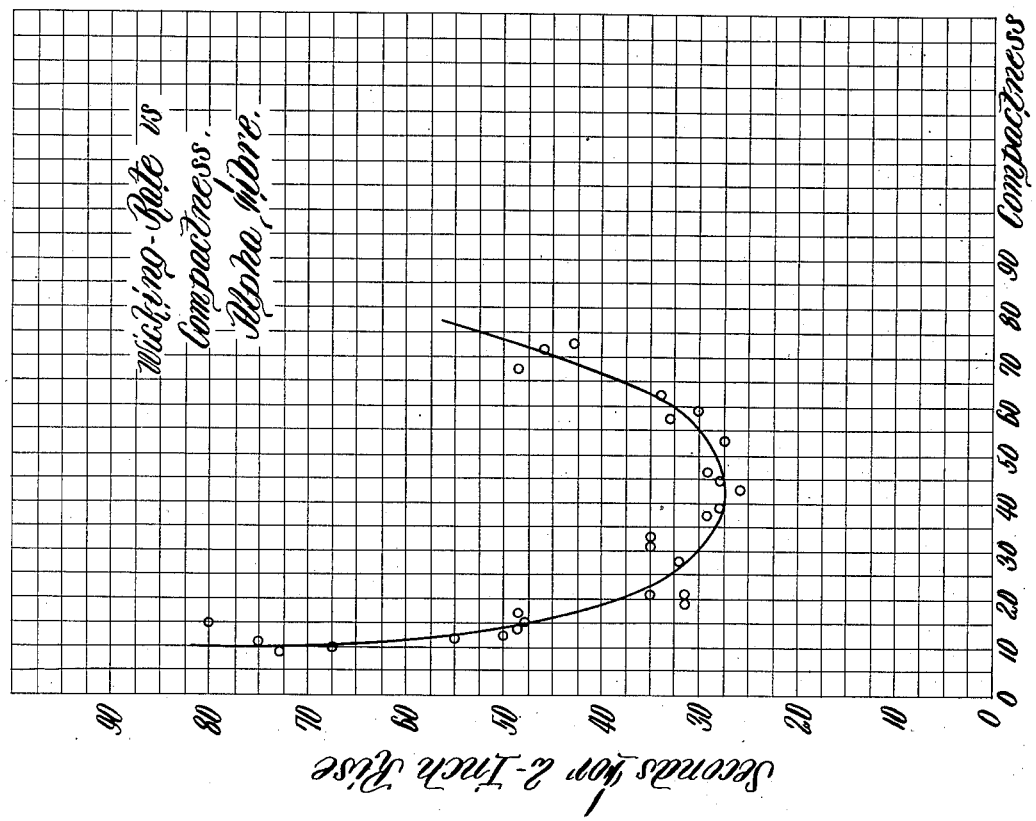

Patented Nov. 22, 1932

1,888,771

UNITED STATES PATENT OFFICE

GEORGE A. RICHTER AND HENRY A. CHASE, OF BERLIN, NEW HAMPSHIRE, ASSIGNORS TO BROWN COMPANY, OF BERLIN, NEW HAMPSHIRE, A CORPORATION OF MAINE

MANUFACTURE OF FELTED FIBROUS SHEET MATERIAL OF HIGH ABSORPTIVITY

Continuation of application Serial No. 198,747, filed June 14, 1927. This application filed August 5, 1931.
Serial No. 555,232.

This invention relates to the manufacture of felted fibrous sheet material, and has for its object the production of such fibrous sheet material of high absorptivity and hence particularly suitable for use as a base for the manufacture of uniformly impregnated products containing, if desired, high percentages of impregnating material.

In manufacturing some impregnated products, it is desirable that the fibrous base which is being impregnated be of high absorptivity in the sense that it is capable of quickly and uniformly absorbing a large amount of impregnating material. Thus, in manufacturing artificial leather by impregnating a felted, fibrous sheet with liquid rubber, as in the form of latex, it is desirable that such sheet be capable of quickly and uniformly absorbing throughout sufficient rubber to impart the necessary body, strength, and elasticity of artificial leather. So, too, in the manufacture of roofing and flooring felt, it is desirable that the felt base be capable of quickly and uniformly imbibing sufficient asphalt or other waterproofing material to render the impregnated product resistant to the deteriorating effects of moisture and weathering.

We have found that a felted sheet of cellulose fiber composed of a high alpha cellulose-containing wood fiber in substantially unbeaten or unhydrated condition and formed and dried on a paper machine, in some instances, without the application of substantial pressure possesses surprisingly high absorptivity and is eminently suitable for use as a base in the manufacture of impregnated products, for instance those described, as a substitute for absorbent cotton in making surgical dressings, and for other purposes where felted, fibrous sheet material of high absorptivity is desirable or necessary. The highly absorptive character of our sheet may be traced to the character of the alpha wood fiber of which it is composed, and its loosely felted, and, in some instances, substantially uncompacted condition.

The alpha wood fiber of which our sheet is composed may be prepared by alkali refining preliberated, chemical wood pulp as described in application, Serial No. 716,154, filed May 27, 1924, by George A. Richter and Milton O. Schur. In accordance with the process described in that application, chemical wood fiber, such as sulphite pulp, is subjected to a series of treatments with chemical reagents, including a treatment with alkaline liquor which serve to dissolve from such wood pulp non-alpha cellulose components, such as less-resistant celluloses, lignocelluloses, and resins, to produce a fiber having an alpha cellulose content of about 93%, or greater. Or the alpha wood fiber may be prepared by processing kraft pulp with alkaline refining liquors as described in application, Serial No. 73,193, filed December 4, 1925, by George A. Richter. An alpha wood fiber possesses the important advantage over cotton that it is less expensive and may be controlled in processing to possess substantially standard characteristics. The alpha wood fiber is preferably felted in an unbeaten or lightly beaten condition, as beating tends to diminish the absorptivity of the resulting sheet and otherwise to impair it for use as a base in impregnated products. As hereinbefore stated, the sheet is formed and dried on a papermaking machine and it may traverse the machine, without being subjected to heavy pressure during any stage of its manufacture. To this end, a paper machine of a combined Fourdrinier and cylinder type, comprising a Fourdrinier wire traveling over a cylinder mould and a large rotary drier, may be used.

A better understanding of our invention may be obtained from the following more complete description thereof when taken in conjunction with the accompanying drawings, wherein Figure 1 illustrates diagrammatically one type of paper machine which may be employed in manufacturing our sheet.

Figure 2 gives curves showing the rate of absorptivity in sheets of alpha wood fiber and sulphite fiber having compactnesses falling outside of the purview of the present invention.

Figure 3 gives a curve showing the rate of absorptivity or wicking in sheets of alpha wood fiber of various compactnesses.

Referring to the drawings, 1 indicates a stock chest into which a substantially unbeaten alpha wood fiber such as described is fed at the desired concentration, say, as a 1% to 2% stock suspension in water. The stock suspension is removed from the chest by a pump 2 and forced through a pipe 3 to a supply tank 4, stationed above the paper machine. The stock suspension is maintained at a constant head in the supply tank, by feeding it in sufficient amount to overflow a baffle 5 into an overflow pipe 6, which returns such overflow to the stock chest. The stock suspension is stirred to produce a uniform suspension in the tank 4, as by an agitator $a$, and flows by gravity therefrom under a regulating gate 7 into a pipe 8 leading to a cylinder-mould vat 9. The stock suspension in passing to the vat may be diluted to any desired lower consistency by introducing water in regulated amount from a water supply pipe 10 communicating with the pipe 8. The stock suspension flows over a baffle 20 into the vat and proceeds in the same direction as a wire 11 travelling over a cylinder mould 12 rotating in the vat. The water carrying the fiber passes through the travelling wire into the cylinder mould and out of the vat through an outlet pipe 13, thereby depositing the fiber in a uniform layer or web on the wire. The wire carrying the wet web passes over one or more suction boxes $b$, and also, if desired, over one or more heating units $d$, which serve to remove excess water from the web. The wire passes over a large rotary drier 14 which serves to dry the web completely on the wire. It is thus seen that the web may be formed and dried without being subjected to pressing or couching at any stage, and hence may remain in a loosely felted, uncompacted condition. After drying, it is removed from the wire in sheet form and wound on a reel 24. The wire passes from the drier over guide rolls 15 and 16, and is thence directed back into the vat by a pair of guide rolls 17. Any fiber remaining on the wire is preferably removed as by a water shower just before passing into the vat.

While the stock suspension may be supplied to the vat at various consistencies, a highly dilute suspension is preferably supplied, as this ensures uniform felting and sheet texture. By drying the web on the forming wire, transverse shrinkage of the web is diminished, as drying occurs under constraint or tension, owing to the entanglement of the web in the wire mesh. The dry sheet is soft, light, and more or less fluffy, and possesses phenomenally high absorptivity.

The high absorptivity of the sheet may be traced to the alpha wood fiber of which it is composed, and its loosely felted, and, in some instances, uncompacted condition. We present herein a table showing certain characteristics of our sheet composed of alpha wood fiber having at least about 93% alpha cellulose, a substantially similar sheet but made of the usual sulphite fiber, a sheet of sulphite fiber paper made on the usual paper machine, and a high grade rag blotting paper.

| | Alpha fiber sheet of present invention | Similar sulphite fiber sheet | Usual sulphite fiber paper | High grade rag blotting paper |
|---|---|---|---|---|
| Basis weight (in lbs.) | 32.2 | 81 | 40 | 211.0 |
| Thickness (in inches) | .0115 | .027 | .038 | .0225 |
| Compactness | 30 to 60 | 30 | 115 | 94 |
| Absorptivity, at least | 600 | 350 | 60 | 130 |

The compactness value hereinbefore given is obtained by dividing the basis weight by the thickness in inches, and multiplying by the factor $10^{-2}$. The expression "basis weight" as known in papermaking circles represents the weight in pounds of 480 sheets whose dimensions are 24 x 36 inches, this being equivalent to 2,880 square feet of sheet material. In other words, the compactness value really represents the weight of fiber per unit volume of sheet material. The absorptivity was ascertained by noting the water crawl up a strip, the values given denoting hundredths inches crawl on the strip in five minutes. It is to be observed that the compactness of the sheet of the present invention is far less, and that its absorptivity is phenomenally greater than that of a sulphite fiber paper or even of a high grade rag blotting paper, and that it is also slightly less compact and far more absorptive than a similar sulphite fiber sheet. Our sheet is therefore an excellent base for the manufacture of impregnated products, such, for example, as the artificial leather described and claimed in application, Serial No. 175,946, filed March 16, 1927, by George A. Richter, or for other uses where fibrous material of high absorptivity is desired.

We cannot account for the phenomenal absorptivity or capillarity which we secure in our product except in terms of its interfelted, waterlaid texture and its particular compactness, coupled with certain properties which a substantially unbeaten, refined wood pulp of an alpha cellulose content of at least about 93% is known to possess. Among the properties of such refined wood pulp is its far greater freedom from fiber fragments and colloidal cellulose, as well as from hemicelluloses and resins, than unrefined wood pulp of the character of sulphite, kraft, or the like. When the fibers of refined wood pulp are well beaten to generate gelatinized or colloidal cellulose and then formed into a sheet of unsized paper, the resulting paper is not much different in its absorptivity from papers made in the same way from an unrefined wood pulp. So, too, when the substantially unbeaten or unhydrated wood pulps are formed into sheets whose compactness falls materially outside of the range of compactness of our product, it makes little difference in so far as concerns rate of absorptivity whether a refined wood pulp or an unrefined wood pulp has gone into the fabrication of the sheets. This can be seen from the two absorptivity curves given in Figure 2, one of the curves being for a sheet made of substantially unbeaten or unhydrated refined wood pulp similar to that used in our product but having a compactness of 71, and the other for a sheet of unbeaten sulphite pulp having a compactness of 74.

The ordinates represent the wicking effect or water crawl, and the abscissæ the time elapsed. These curves practically coincide over a five-minute period. The refined wood pulp curve is only slightly above that of the sulphite pulp curve, even though the refined wood pulp sheet was of three units lower compactness than the sulphite pulp sheet. In securing the data for drawing the curves, strips were cut from the sheet material and dot-marked with an indelible pencil at various distances from one end. Each strip was then immersed to the first dot in water at 20° C. and the time in seconds for the water to rise various distances, denoted by change in color of the indelible dots, was recorded as the wicking effect or absorptivity. This method was found reliable and capable of being checked. Within wide limits, the width of the strip did affect the wicking effect or absorptivity.

When loose or fluffed dry pulp is, as such, formed into layers or sheets having a compactness much lower than our product, for instance a form comparable to so-called absorbent cotton or cotton batting, one does not realize much more absorptivity in the case of a refined wood pulp such as we use than in the case of the usual commercial sulphite pulp having an alpha cellulose content of about 87%, even though such sheets of refined wood pulp are primarily, on account of their purity, softness and stability, better suited for surgical dressings. Thus, absorptivity tests performed on sheets fabricated in a dry way from refined wood pulp and sheets similarly fabricated from sulphite pulp gave the following results:

|  | Wicking effect time in seconds to rise 2 inches |
|---|---|
| Refined wood pulp | 31 |
| Sulphite pulp | 35 |

The refined wood pulp was similar to that used in our product but the sheets formed with this material and with the sulphite pulp had a compactness of about 8. It is thus seen that in sheet form other than that of the present invention, a refined wood pulp is not at all strikingly more absorptive than is an unrefined wood pulp. This conclusion is further well borne out by the curve given in Figure 3 for the absorptivity or wicking rate in sheets of alpha wood fiber of various compactnesses. The wicking rate represented by the ordinates is given in terms of seconds for a 2-inch rise or crawl of water up strips cut from the sheets of various compactnesses. The sheets were all made of an alpha wood fiber such as we use in producing our product. It is to be observed that the curve is sharply descending in the regions of low compactness, becomes comparatively flat or has minimum curvature in the region of compactness of our product, and is sharply ascending in the region of high compactness. In other words, when one departs materially in either direction from the compactness region whereinto our product falls, he avails himself so little of the quality of absorbency inherent in a refined wood pulp that such pulp is little better in this quality than is an unrefined wood pulp. Our product, on the other hand, is one in which maximum advantage is taken of the quality of absorbency in refined wood pulp. Maximum absorbency or capillarity is a prime desideratum, for instance, when the sheet is to be impregnated with water-dispersed materials, such as rubber latex. In such case, the latex penetrates our sheet so quickly and so uniformly that it is a simple matter to secure complete and uniform impregnation even when a continuous sheet of our product is moved progressively through a bath of the latex quickly and with but a short stretch of the sheet immersed in the bath. At the same time, our sheet has sufficient integrity so that it can be safely handled and impregnated.

In the region of compactness of our sheet, i. e., weight of wood pulp per unit volume of sheet, there is a certain percentage of void space in the sheet. This space is not continuous, but is made up of interstices or canals which, if evidently kept at a certain size, are conducive to high capillarity or absorptivity in the sheet. In the case of our sheet, which is fabricated from substantially unbeaten wood pulp of an alpha cellulose content of at least about 93% containing a relatively slight amount of fiber fragments, colloidal cellulose, resinous matter, and the like, the capillary interstices or canals in the sheet evidently remain open to promote maximum capillary action, whereas such action is evidently greatly impeded in a similar sheet fabricated from unrefined wood pulp, such as sulphite, on account of fiber fragments, colloidal cellulose, and resinous matter entering into the capillary interstices and canals and altering their dimensions from optimum value. Moreover, a similar sulphite pulp sheet shrinks to a greater extent during drying; and colloidal and water-soluble materials being present in greater amount, tend to diffuse or migrate to the surface, where evaporation of water is taking place, and thus to clog the surface pores, as attested by a skin formation or "case hardening" on such a sheet. These latter factors, too, are evidently partially responsible for the vastly inferior absorptivity of the sulphite pulp sheet. In other words, where the interstitial spaces in the sheet are exceedingly small, as in a highly compacted sheet, or where the interstitial spaces are comparatively large, as in loose, bulk pulp with a random fiber arrangement, the character of the pulp is evidently of little importance in determining absorptivity. In the case of a water-laid sheet of loosely interfelted wood fibers, however, and more especially of a sheet possessing a compactness of about 30 to 60, a refined wood pulp of an alpha cellulose content of at least about 93% gives a product of suprisingly high absorptivity or capillarity.

In attaining the compactness values in the felts of the present invention, and more particularly those values at the lower end of the range hereinbefore given, it may, as already indicated, be necessary to dispense practically entirely with the use of pressure devices on the papermaking machine. This is especially true when the pulp used as raw material is a refined sulphite pulp whose refinement has been brought about in hot, comparatively dilute, alkaline liquors, as disclosed in aforementioned application Serial No. 716,154, filed May 27, 1924, by George A. Richter and Milton O. Schur. Felts of such low compactness are of great value in making bituminized sheets for roofing and analogous purposes where a maximum bitumen or asphalt content is desired, and in making other impregnated products wherein a maximum content of impregnant is desired. On the other hand, when the pulp has been refined in comparatively cold, concentrated alkaline liquors, as disclosed in aforementioned application Serial No. 73,193, filed December 4, 1925, by George A. Richter, the felts fabricated from such pulp tend to be bulkier and may hence require more or less compacting or condensing during fabrication, particularly when felts where compactness values lie at the upper end of the range hereinbefore given are sought in accordance with our invention. Felts whose compactness lie at the upper end of the range are of great value in making bituminized sheets for floorings where high moldability, stretchability, and yieldability under distorting or denting influences are indescribable qualities, and in making other impregnated products. While it is possible to use bleached or unbleached refined pulps in making the felts of the present invention, we do not herein claim specifically the use of unbleached pulps for this purpose, as this constitutes a separate invention disclosed and claimed in application Serial No. 580,496, filed December 11, 1931, by George A. Richter. Impregnated products containing the felted base of the present invention are characterized by highly desirable characteristics attributable to the refined but substantially unhydrated, chemically preliberated, cellulose pulp which has entered thereinto as a principal raw material. Thus, bituminized sheets containing an alkali-refined but substantially unhydrated wood pulp as a principal raw material are possessed of a tear resistance conspicuously greater than a product containing a cotton or rag felt base, being, in fact, practically tear proof. We do not, however herein claim such bituminized sheets, for this subject matter is disclosed and claimed in our application Serial No. 570,034, filed October 20, 1931.

So far as certain subject matter is concerned, this is a continuation of our application, Serial No. 198,747, filed Junue 14, 1927.

We claim:

1. A water-laid sheet of loosely felted, substantially uncompacted and unbeaten wood pulp having an alpha cellulose content of at least about 93%, said sheet having an absorptivity of at least about six inches in terms of water crawl up a strip in five minutes.

2. A water-laid sheet of loosely felted and substantially unbeaten wood pulp having an alpha cellulose content of at least about 93%, said sheet having a compactness value falling between about 30 and 60 in terms of basis weight divided by thickness in inches and multiplied by the factor $10^{-2}$.

3. A water-laid sheet of loosely felted, substantially unbeaten wood pulp having an alpha cellulose content of at least about 93%, said sheet having a compactness value falling between about 30 and 60 in terms of basis weight divided by thickness in inches and multiplied by the factor $10^{-2}$, and said sheet having an absorptivity of at least about six inches in terms of water crawl up a strip in five minutes.

4. A bulky, highly absorptive, water-laid sheet of loosely felted and substantially unhydrated, chemically preliberated cellulose pulp, refined to an alpha cellulose content of at least about 93%.

5. A highly absorptive, waterlaid felt containing as a principal raw material substantially unhydrated, preliberated wood pulp refined to an alpha cellulose content of at least about 93%.

6. A highly absorptive waterlaid felt containing as a principal raw material substantially unhydrated, chemically preliberated wood pulp refined by alkali to a higher alpha cellulose content than that present therein at the time of its liberation.

7. A process which comprises liberating cellulose pulp from raw cellulosic material, refining such pulp in an alkaline liquor to a higher alpha cellulose content, and making felt from such refined pulp in a substantially unhydrated condition.

8. A process which comprises refining pre-liberated wood pulp in an alkaline liquor to a higher alpha cellulose content, and making a waterlaid felt from a furnish containing such refined pulp in substantially unhydrated condition.

9. A process which comprises refining pre-liberated chemical wood pulp in an alkaline liquor to an alpha cellulose content of at least about 93%, and making from a furnish containing such refined wood pulp in a substantially unhydrated condition, a waterlaid felt whose compactness value falls between about 30 and 60 in terms of basis weight divided by thickness in inches and multiplied by the factor $10^{-2}$.

In testimony whereof we have affixed our signatures.

GEORGE A. RICHTER.
HENRY A. CHASE.